H. B. SOMMERS.
Sounding Chain.
No. 7,826.
Patented Dec. 10, 1850.
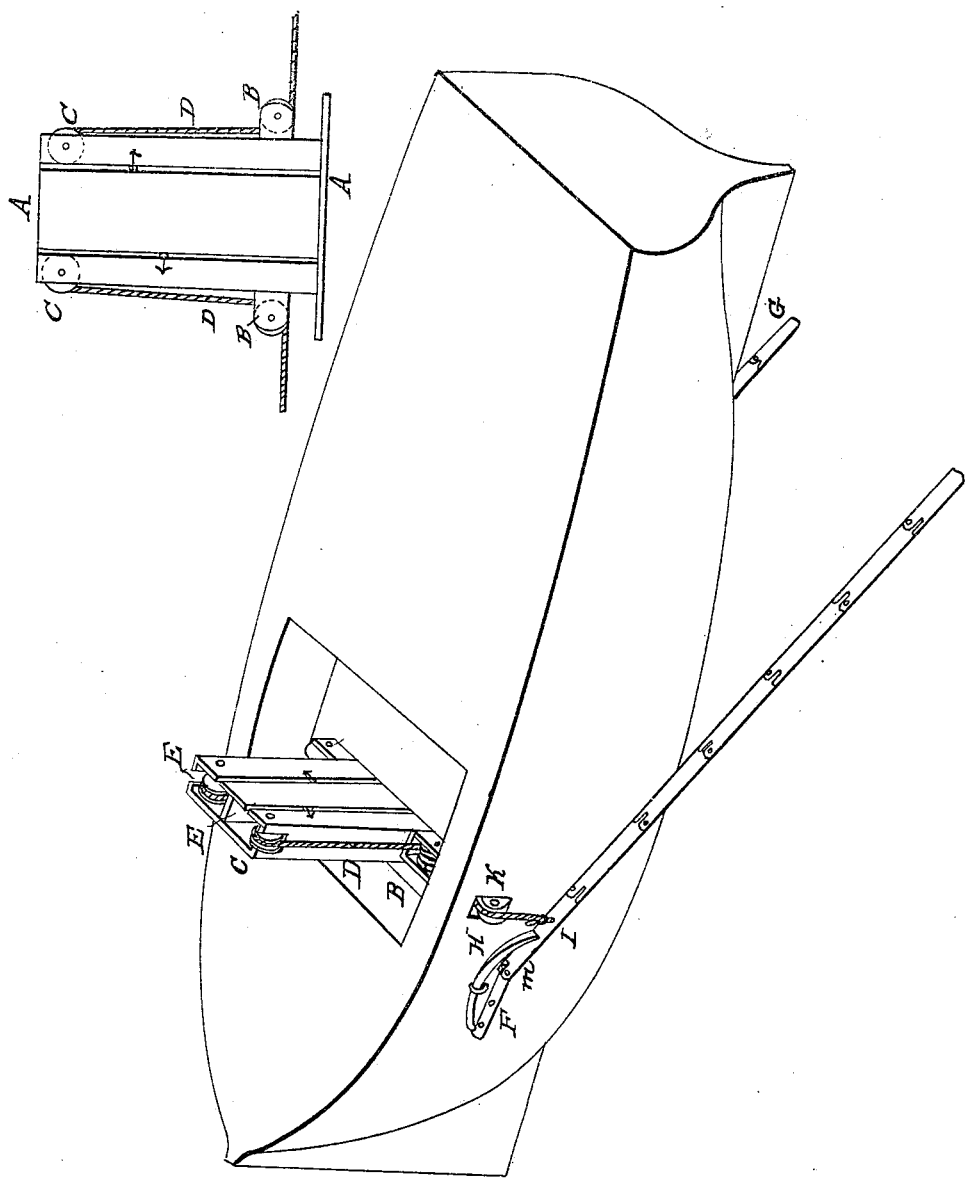

UNITED STATES PATENT OFFICE.

HENRY B. SOMMERS, OF ITHACA, NEW YORK.

APPARATUS ATTACHED TO VESSELS FOR INDICATING THE DEPTH OF WATER.

Specification of Letters Patent No. 7,826, dated December 10, 1850.

*To all whom it may concern:*

Be it known that I, HENRY B. SOMMERS, of Ithaca, in the county of Tompkins and State of New York, have invented a new and useful instrument called a "sounding-chain," to be used on vessels and all water-crafts to sound and indicate the depth of water in their path; and I do hereby declare that the following is a full and exact description thereof, reference being had to the drawings hereunto annexed.

F, G, represents chain or jointed rod of proper metallic substance with joints allowing it to be bent by any obstruction meeting it laterally from either side or in a direction from stern to bow but it is inflexible in a direction from bow to stern and of sufficient weight to resume its perpendicular position after the obstruction is removed. H, spring bent over joint —m— and of sufficient strength to keep chain F, G, in a perpendicular position when acted upon by water only. It is sunk with the chain F, G, into the vessel's side to protect it from external injury. J, cord attached to chain F, G, below spring H, and passing from chain F, G, over pulley K, under pulley B, over pulley C, and connects with needle E. m, joint in chain F, G, that will allow it to bind in a direction toward the stern so that when vessel is in motion forward and chain F, G, comes in contact with the bottom, this joint, m, only is moved and that motion is communicated by the cord J, to the needle E. E, needle, with weight attached to return it to its position after it has been moved by action of chain. A, A, scale with degrees to measure the different variations of the needle E, consequent upon the movement of the chain when in contact with the bottom and hence showing the depth of the water in the vessel's path. The needle E, changing its position on the scale in proportion as more or less of the chain is in contact with the bottom. Scale A A is located in a convenient position in the wheel house where the pilot from his place may watch the movement of the needle.

A chain or jointed rod with the other accompaniments above described is attached in the same manner from each side of the vessel so as to give warning of a shoal or reef upon one side of the vessel when there is no obstruction upon the other side as well as to show the pilot upon which side he is approaching shoal water.

What I claim as my invention and desire to secure by Letters Patent is—

The combination of a sounding chain or jointed rod with an indicator on the deck of a vessel, operated by means of a cord, pulley or other equivalents, so as to indicate the depth of water while the boat is making headway, as herein described and represented.

H. B. SOMMERS.

In presence of—
JEROME ROWE,
JAMES CLARKE.